Aug. 17, 1926. 1,596,829
C. O. GUERNSEY
POWER TRANSMITTING GEARING
Filed April 25, 1925    5 Sheets-Sheet 1

Inventor.-
Charles O. Guernsey.
by his Attorneys.-
Howson & Howson

Aug. 17, 1926.　　　　　　　　　　　　　　　1,596,829
C. O. GUERNSEY
POWER TRANSMITTING GEARING
Filed April 25, 1925　　5 Sheets-Sheet 2

Inventor.—
Charles O. Guernsey.
by his Attorneys.
Howson & Howson

Aug. 17, 1926.

C. O. GUERNSEY

POWER TRANSMITTING GEARING

Filed April 25, 1925   5 Sheets-Sheet 3

1,596,829

Inventor:
Charles O. Guernsey,
by his Attorneys.
Howson & Howson

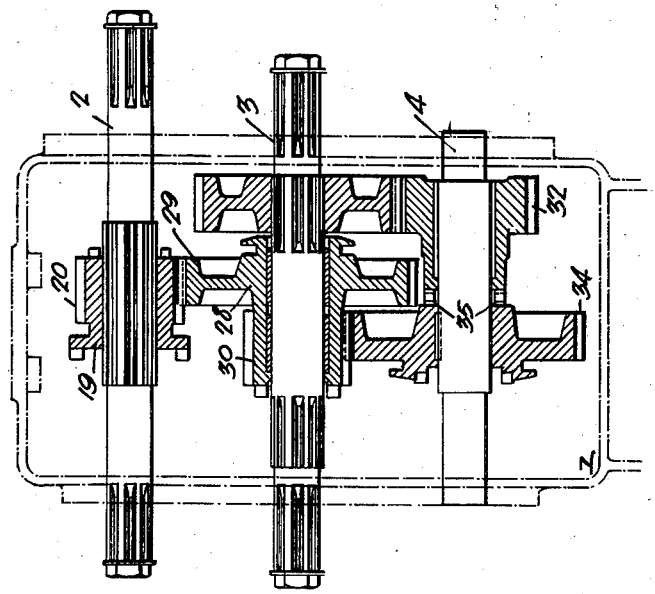

Aug. 17, 1926.

C. O. GUERNSEY 1,596,829

POWER TRANSMITTING GEARING

Filed April 25, 1923    5 Sheets-Sheet 5

Inventor
Charles O. Guernsey,
by his Attorneys
Howson & Howson

Patented Aug. 17, 1926.

1,596,829

UNITED STATES PATENT OFFICE.

CHARLES O. GUERNSEY, OF PHILADELPHIA, PENNSYLVANIA.

POWER-TRANSMITTING GEARING.

Application filed April 25, 1925. Serial No. 25,812.

This invention relates to a speed changing power transmitting mechanism particularly applicable for use on self-propelled railway cars or coaches of the type in which the transmission mechanism is located on the truck frame. Coaches of this type are shown and described in my patent for railway motor coach, No. 1,544,574, dated July 7, 1925, in my copending application for power transmitting mechanism for railway motor coaches, Ser. No. 25,813, filed on even date herewith, and in my patent for drive for auxiliary apparatus No. 1,528,373, dated March 3, 1925.

The principal object of the invention is to provide a speed changing power transmission mechanism having an improved and simplified arrangement of gears whereby a plurality of speeds, preferably five speeds, may be obtained and whereby power can be transmitted at at least two and preferably three different points. Further objects of the invention will be apparent from the following specification and claims.

In the accompanying drawings I have shown the embodiment of the invention which I now deem preferable but it will be understood that the invention can be embodied in other ways and that the form shown has been selected merely for purposes of illustration. Various changes and substitutions may be made within the scope of the claims without departing from the spirit of the invention.

Of the drawings:

Figs. 4 to 8 are diagrammatic views showing different positions of the gears.

Figure 1:
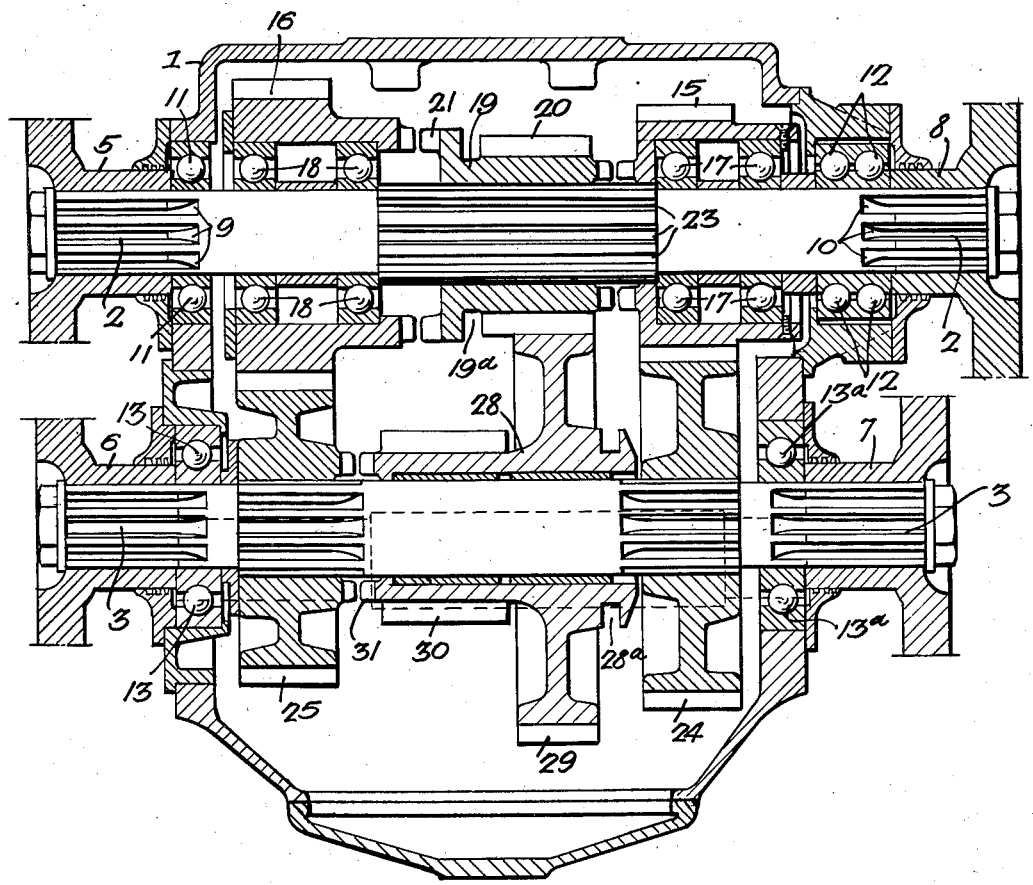
Fig. 1 is a vertical sectional view of the speed changing power transmitting gearing taken on the line 1—1, Fig. 3.
Figure 2:
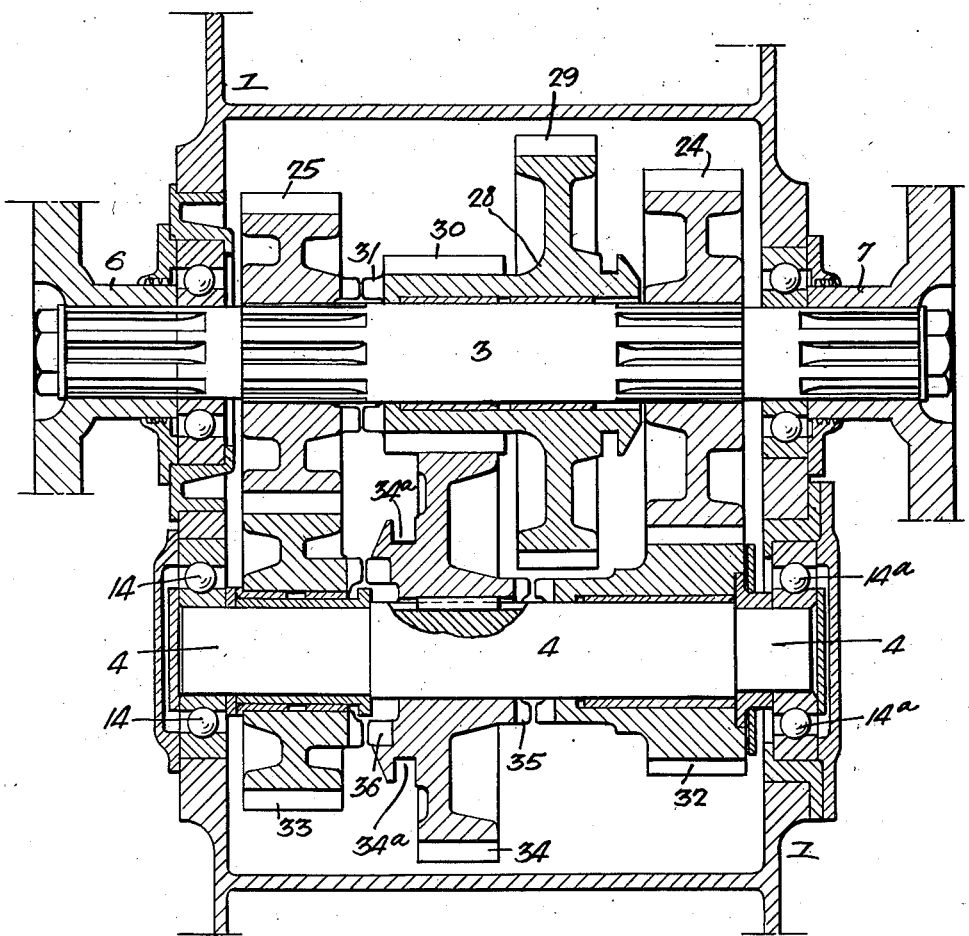
Fig. 2 is a horizontal view taken looking upward along the line 2—2 of Fig. 3.
Figure 3:
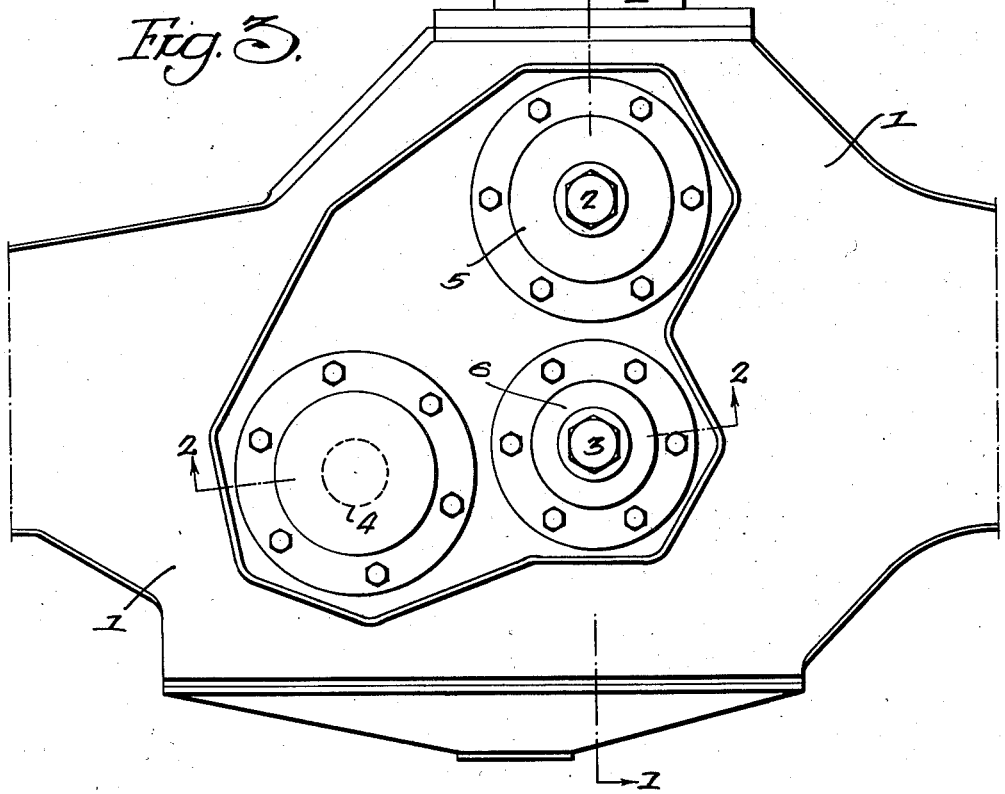
Fig. 3 is an end view.

Referring particularly to Fig. 1, it will be seen that a main casing or housing 1 is provided in which are mounted a drive shaft 2 and a driven shaft 3. There is also a back gear shaft 4 as shown more clearly in Fig. 2. When the gearing is mounted on a coach truck the casing 1 is preferably a part of the truck bolster. A driving member 5 is connected to one end of the shaft 2, and driven members 6 and 7 are connected with the respective ends of the shaft 3. Preferably also a driven member 8 is connected with the opposite end of the shaft 2.

The driving member 5 and the driven member 8 are preferably connected with the shaft 2 by means of integral keys which enter keyways 9 and 10 cut in the shaft. The shaft 2 is mounted in ball bearings 11 and 12 carried by the walls of the casing 1. The driven members 6 and 7 are similarly mounted on a shaft 3 and this shaft is mounted in ball bearings 13 and 13ª carried by the walls of the casing. The shaft 4 is mounted on ball bearings 14 and 14ª carried by the walls of the bolster 1.

Rotatably mounted on the shaft 2 are two gears 15 and 16 of different diameters, the former being somewhat smaller than the latter. These gears are carried respectively by ball bearings 17, 17 and 18, 18. Splined on the shaft 2 between the gears 15 and 16 is a member 19 having gear teeth at 20. This member also has clutch teeth 21 adapted to engage with similar clutch teeth formed on the gear 16 and clutch teeth 22 adapted to engage with similar clutch teeth on the gear 15. The member 19 is preferably formed with integral keys which enter similarly formed longitudinal grooves 23 cut in the shaft 2. It will be seen that, by moving the member 19 endwise to engage either one of the gears 15 or 16, the gear so engaged is operatively connected to the shaft 2. The member 19 has a groove 19ª adapted to receive a fork which serves to move the member endwise as required.

Rigidly secured to the shaft 3 are two gears 24 and 25 which are permanently in mesh respectively with the before-mentioned gears 15 and 16. These gears 24 and 25 preferably have integrally formed keys entering similarly formed keyways 26 and 27 cut in the shaft 3. Rotatably mounted on the shaft 3 between the two gears 25 and 26 is a gear unit 28 comprising gear teeth at 29 and at 30. The gear formed by the teeth 29 is permanently in mesh with the gear 20. The gear unit 28 is also formed with clutch teeth 31 adapted to mesh with similar clutch teeth formed on the gear 25. The gear unit 28 is provided with a groove 28ª adapted to receive a fork whereby the member may be moved endwise as required.

Rotatably mounted on the shaft 4 are two gears 32 and 33 which are permanently in mesh respectively with gears 24 and 25. Splined on the shaft 4 between the gears 32 and 33 is a gear 34 which is permanently in mesh with the gear 30. Carried by the gear 34 are clutch teeth 35 adapted to mesh with similar teeth on the gear 32 and clutch teeth 36 adapted to mesh with similar teeth on the gear 33. The gear 34 is provided with a groove 34ª adapted to receive an operating fork whereby the gear can be moved endwise as required.

The mechanism for shifting the several gears endwise does not of itself constitute a part of the present invention, and is not shown; but I prefer to use a mechanism such as shown in my copending application for gear shifting mechanism, Ser. No. 17,213, filed March 21, 1925.

By referring to the gear diagrams, Figs. 4 to 8, the various arrangements of the gears for different speed will be understood. The first speed is shown in Fig. 4 which illustrates the gear 34 moved toward the right to engage the gear 32. It will be noted that there are three successive reductions of speed between the shaft 2 and the shaft 3.

As shown in Fig. 5, the gear 34 is moved toward the left to engage the gear 33. Inasmuch as the gears 33 and 25 are of approximately the same diameter there are but two reductions of speed.

Figure 6:
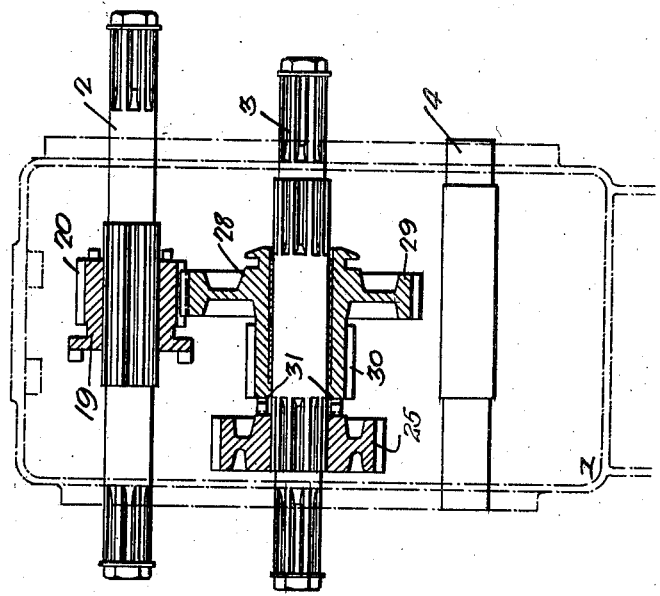

The third speed is shown in Fig. 6 and in this case, the gear member 28 is moved toward the left to engage the gear 25. In this case there is but a single reduction of speed.

Figure 7:
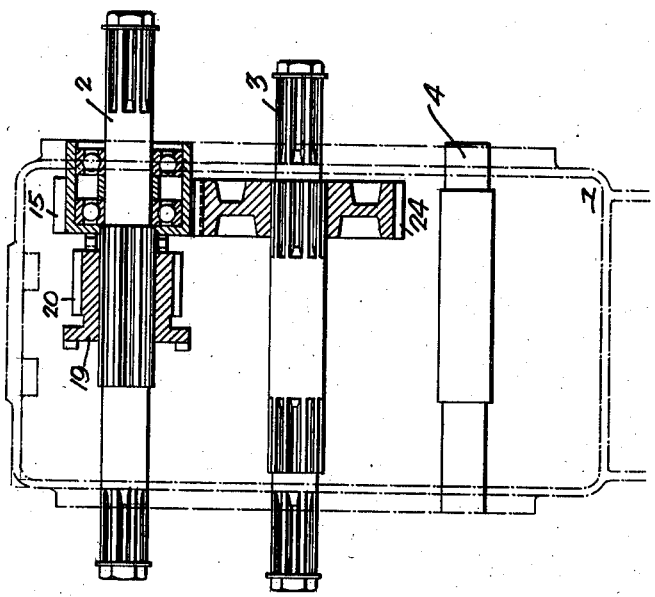

The fourth speed is shown in Fig. 7. In this case the gear member 20 is moved toward the right to engage the gear 15. In this case there is but a single reduction of speed, this being a smaller reduction than that shown in Fig. 6, by reason of the fact that the gears 15 and 24 have a smaller ratio than the gears 20 and 29.

Figure 8:
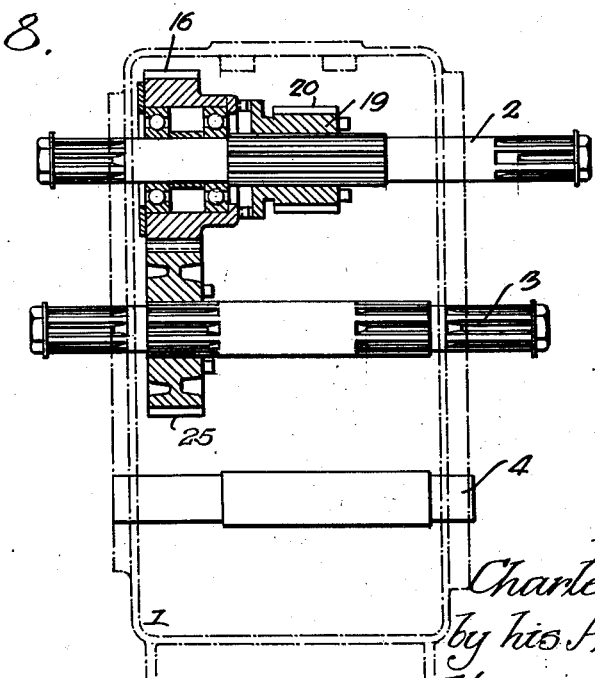

The fifth speed is shown in Fig. 8 wherein the member 19 is shown as moved toward the left to engage the gear 16. Inasmuch as the gears 16 and 25 are of the same diameter, there is no reduction in speed.

From the foregoing description it will be observed that three separate trains of permanently meshed gear units are provided to connect the three shafts. Most of the gear units are single gears as already fully described, but there is included the double gear unit 28 already mentioned. The gear units constituting the trains at the two sides are held against endwise or axial movement, and various speed ratios can be obtained by axially shifting the units of the central train. Only one of the shiftable units is required to be moved out of its neutral position for any one speed. This makes it possible to provide a very simple and conveniently operated shifting mechanism such as I have shown. The transmission mechanism not only provides a series of conveniently obtainable speeds, but it serves to transmit the power from the initial driving member to two separate driven members rotatable at the same speed about an axis separate from that of the driving member. There is also provided means whereby a third driven member may be actuated at a speed which is always the same as that of the driving member not being subject to the variable speeds transmitted to the first said driven members.

What I claim is:

1. In a speed changing power transmission mechanism of the type described, the combination of a driving shaft, a driven shaft and a back gear shaft all parallel with each other; three permanently meshing gear trains each comprising three gear units mounted respectively on the three shafts, successive gear units on each shaft being alternately rotatable on the shaft and rotatably connected therewith and each pair of meshing gear units on the driving and driven shafts consisting of one rotatable and one rotatably connected gear unit; means for connecting the central gear unit on one of the first two said shatfs with either of the adjacent gear units to provide two speeds for the driven shaft; and means for connecting the central gear unit on the back gear shaft with either of the adjacent gear units to provide two additional speeds for the driven shaft.

2. In a speed changing power transmission mechanism of the type described, the combination of a driving shaft, a driven shaft and a back gear shaft all parallel with each other; means whereby the driving shaft may receive power at one end and transmit it at the other end; means whereby the driven shaft may transmit power at both ends; successive gear units on each shaft being alternately rotatable on the shaft and rotatably connected therewith and each pair of meshing gear units on the driving and driven shafts consisting of one rotatable and one rotatably connected gear unit; means for connecting the central gear unit on one of the first two said shafts with either of the adjacent gear units to provide two speeds for the driven shaft; and means for connecting the central gear unit on the back gear shaft with either of the adjacent gear units to provide two additional speeds for the driven shaft.

3. In a speed changing power transmission mechanism of the type described, the combination of a driving shaft, a driven shaft and a back gear shaft all parallel with each other; three permanently meshing gear trains each comprising three gear units mounted respectively on the three shafts, successive gear units on each shaft being alternately rotatable on the shaft and rotatably connected therewith and each pair of meshing gear units on the driving and driven shafts consisting of one rotatable and one rotatably connected gear unit; means for connecting the central gear unit on one of the first two said shafts with either of the adjacent gear units to provide two speeds for the driven shaft; means for connecting the central gear unit on the other of the first two said shafts with one of the adjacent gear units to provide a third speed for the driven shaft; and means for connecting the central gear unit on the back gear shaft with either of the adjacent gear units to provide two additional speeds for the driven shaft.

4. In a speed changing power transmission mechanism of the type described, the combination of a driving shaft, a driven shaft and a back gear shaft all parallel with each other; three permanently meshing gear trains each comprising three gear units mounted respectively on the three shafts, successive gear units on each shaft being alternately rotatable on the shaft and rotatably connected therewith and each pair of meshing gear units on the driving and driven shafts consisting of one rotatable and one rotatably connected gear unit; means for connecting the central gear unit on one of the first two said shafts with either of the adjacent gear units to provide two speeds for the driven shaft, the connection for each speed being obtained by the axial movement of a single gear unit; and means for connecting the central gear unit on the back gear shaft with either of the adjacent gear units to provide two additional speeds for the driven shaft, the connection for each speed being obtained by the axial movement of a single gear unit.

5. In a speed changing power transmission mechanism of the type described, the combination of a driving shaft, a driven shaft and a back gear shaft all parallel with each other; three permanently meshing gear trains each comprising three gear units mounted respectively on the three shafts, successive gear units on each shaft being alternately rotatable on the shaft and rotatably connected therewith and each pair of meshing gear units on the driving and driven shafts consisting of one rotatable and one rotatably connected gear unit; means for axially moving the central gear unit on one of the first two said shafts to connect it with either of the adjacent gear units and thereby provide two speeds for the driven shaft; and means for axially moving the central gear unit on the back gear shaft to connect it with either of the adjacent gear units and thereby provide two additional speeds for the driven shaft.

6. In a speed changing power transmission mechanism of the type described, the combination of a driving shaft, a driven shaft and a back gear shaft all parallel with each other; three permanently meshing gear trains each comprising three gear units mounted respectively on the three shafts, the outer gear units on the driving and back gear shafts and the central gear unit on the driven shaft being rotatable relatively to their respective shafts and the remaining gear units being rotatably connected with their respective shafts; means for connecting the central gear unit on the driving shaft with either of the adjacent gear units to provide two speeds for the driven shaft; and means for connecting the central gear unit on the back gear shaft with either of the adjacent gear units to provide two additional speeds for the driven shaft.

7. In a speed changing power transmission mechanism of the type described, the combination of a driving shaft, a driven shaft and a back gear shaft all parallel with each other; three permanently meshing gear trains each comprising three gear units mounted respectively on the three shafts, the outer gear units on the driving and back gear shafts and the central gear unit on the driven shaft being rotatable relatively to their respective shafts and the remaining gear units being rotatably connected with their respective shafts; means for connecting the central gear unit on the driving shaft with either of the adjacent gear units to provide two speeds for the driven shaft; means for connecting the central gear unit on the driven shaft with one of the adjacent gear units to provide a third speed for the driven shaft; and means for connecting the central gear unit on the back gear shaft with either of the adjacent gear units to provide two additional speeds for the driven shaft.

8. In a speed changing power transmission mechanism of the type described, the combination of a driving shaft, a driven shaft and a back gear shaft all parallel with each other; three permanently meshing gear trains each comprising three gear units mounted respectively on the three shafts, the outer gear units on the driving and back gear shafts and the central gear unit on the driven shaft being rotatable relatively to their respective shafts and the remaining gear units being rotatably connected with their respective shafts; means for axially moving the central gear unit on the driving shaft to connect it with either of the adjacent gear units and thereby provide two speeds for the driven shaft; and means for axially moving the central gear unit on the back gear shaft to connect it with either of the adjacent gear units and thereby provide two additional speeds for the driven shaft.

9. In a speed changing power transmission mechanism of the type described, the combination of a driving shaft, a driven shaft and a back gear shaft all parallel with each other; three permanently meshing gear trains each comprising three gear units mounted respectively on the three shafts, the outer gear units on the driving and back gear shafts and the central gear unit on the driven shaft being rotatable relatively to their respective shafts and the remaining gear units being rotatably connected with their respective shafts; means for axially moving the central gear unit on the driving shaft to connect it with either of the adjacent gear units and thereby provide two speeds for the driven shaft; means for axially moving the central gear unit on the driven shaft to connect it with one of the adjacent gear units and thereby provide a third speed for the driven shaft; and means for axially moving the central gear unit on the back gear shaft to connect it with either of the adjacent gear units and thereby provide two additional speeds for the driven shaft.

10. In a speed changing power transmission mechanism of the type described, the combination of a driving shaft provided with means for receiving power at one end thereof; a driven shaft parallel with the driving shaft and provided with means for transmitting power at one end thereof; a back gear shaft parallel with the driving and driven shafts; three pairs of permanently meshing gears connecting the driving and driven shafts and having different ratios; means for rendering any pair of the said gears operative to transmit power directly from one shaft to the other or for rendering all of them inoperative; three gears on the back gear shaft having permanent operative connections respectively with the three gears on the driven shaft; and means for connecting one of the last said gears with either one of the other two to provide two additional gear ratios between the driving and driven shafts when the three first said pairs of gears are inoperative to transmit power directly.

11. In a speed changing power transmission mechanism of the type described, the combination of a driving shaft proivded with means for receiving power at one end thereof; a driven shaft parallel with the driving shaft and provided with means for transmitting power at one end thereof; a back gear shaft parallel with the driving and driven shafts; three permanently meshing gear trains of at least three gears each mounted respectively on the three shafts, the outer gears on the driving and back shafts being rotatably mounted and the intermediate gears being splined and the outer gears on the driven shaft being fixedly mounted and the intermediate gear being rotatably mounted and movable endwise; means for moving axially any gear in the third train; and means whereby the gear which is moved axially as aforesaid can operatively engage the next adjacent gear on the same shaft.

12. In a speed changing power transmission mechanism of the type described, the combination of a driving shaft provided with means for receiving power at one end thereof; a driven shaft parallel with the driving shaft and provided with means for transmitting power at one end thereof; a back gear shaft parallel with the driving and driven shafts; a train of three permanently meshing gears mounted respectively on the three shafts; a second train of permanently meshing gears mounted respectively on the three shafts, all of the aforesaid gears being held against axial movement; a third train of permanently meshing gears mounted respectively on the three shafts between the first said trains; means for moving axially any gear in the third train independently of those on any other shaft; and means whereby the gear which is moved axially as aforesaid can operatively engage the next adjacent gear on the same shaft.

13. In a speed changing power transmission mechanism of the type described, the combination of a driving shaft provided with means for receiving power at one end thereof; a driven shaft parallel with the driving shaft and provided with means for transmitting power at one end thereof; a back gear shaft parallel with the driving and driven shafts; a train of three permanently meshing gears mounted respectively on the three shafts; a second train of permanently meshing gears mounted respectively on the three shafts, all of the aforesaid gears being held against axial movement; a third train of permanently meshing gears mounted respectively on the three shafts between the first said trains, the said train including two connected gears of different diameters on the driven shaft; means for moving axially any gear in the third train independently of those on any other shaft; and means whereby the gear which is moved axially as aforesaid can operatively engage the next adjacent gear on the same shaft.

CHARLES O. GUERNSEY.